United States Patent
Babuka et al.

[11] Patent Number: 6,152,580
[45] Date of Patent: Nov. 28, 2000

[54] APPARATUS AND METHOD FOR PRODUCING COLLIMATED LIGHT FROM AN AREA SOURCE

[75] Inventors: Robert Babuka, Vestal, N.Y.; Jennifer M. Cohen, Harrisburg, Pa.; Raymond G. Greene, Ovid, N.Y.; Dean W. Skinner, Vestal, N.Y.; Boris Yost, Ithaca, N.Y.

[73] Assignee: Rainbow Displays, Inc., Endicott, N.Y.

[21] Appl. No.: 09/024,481

[22] Filed: Feb. 17, 1998

[51] Int. Cl.⁷ .................................................. F21V 11/06
[52] U.S. Cl. ........................... 362/330; 362/290; 362/342
[58] Field of Search .................................... 362/330, 342, 362/290; 349/61, 62, 64, 66, 73; 40/541, 564

[56] References Cited

U.S. PATENT DOCUMENTS

| | | | |
|---|---|---|---|
| 2,398,799 | 4/1946 | Miller | 362/342 |
| 3,413,745 | 12/1968 | Cabe | 40/564 |
| 4,005,538 | 2/1977 | Tung | 40/564 |
| 4,915,479 | 4/1990 | Clarke | 349/64 |
| 5,044,734 | 9/1991 | Sperl et al. | 349/64 |
| 5,128,783 | 7/1992 | Abileah et al. | 349/64 |
| 5,598,281 | 1/1997 | Zimmerman et al. | 349/62 |
| 5,661,531 | 8/1997 | Greene et al. | 349/73 |
| 5,808,719 | 9/1998 | Fujiwara et al. | 349/73 |

FOREIGN PATENT DOCUMENTS

| | | | |
|---|---|---|---|
| 404022938 | 1/1992 | Japan | 349/62 |
| 406051338 | 2/1994 | Japan | 349/73 |

OTHER PUBLICATIONS

Gerard A. Alphonse and Jeffrey Lubin, "Psychophysical Requirements for Tiled Large Screen Displays", SPIE Journal vol. 1664, pp. 230–240, 1992.

*Primary Examiner*—Alan Cariaso
*Attorney, Agent, or Firm*—Salzman & Levy

[57] ABSTRACT

The present invention features an apparatus and method for collimating light for use with a tiled, flat-panel display having a seamless appearance (i.e., having visually imperceptible seams). A novel, multi-cell, collimation lattice is placed behind the bottom mask of the tiled, flat-panel display assembly, but in front of an illumination source. The lattice is formed from a thin, non-reflective material, so that the acceptable light passing through the lattice is not "blocked", but the unwanted (off-axis) light impinges upon the lattice cell walls and is absorbed.

15 Claims, 5 Drawing Sheets

(a) Square (b) Triangular (c) Hexagonal

APPARATUS AND METHOD FOR PRODUCING COLLIMATED LIGHT FROM AN AREA SOURCE

FIELD OF THE INVENTION

The present invention relates to an apparatus and method for producing highly collimated light and, more particularly, to a method for producing highly collimated light for use with a tiled, flat-panel liquid crystal display (LCD).

BACKGROUND OF THE INVENTION

Conventional flat-panel displays made in accordance with known liquid crystal display technologies have heretofore been both limited in size and expensive to manufacture. A large display device may be constructed at reduced cost by assembling multiple smaller display "tiles". However, it is necessary to make the internal seams visually imperceptible to create a pleasing display.

For the seams to be visually imperceptible and for the display image to be sharp, the light used to illuminate the display must be highly collimated. A collimated light source must allow essentially no visible energy to radiate beyond an allowable off-normal angle. The allowable off-normal angle is prescribed by the tile thickness and the cover plate mask and back plate mask dimensions. It is defined as the critical off-normal angle below which light from the illumination source must not enter the tile to tile seam area. This type of tiled display construction is described in U.S. Pat. No. 5,661,531, entitled "Construction and Sealing of Tiled, Flat-Panel Displays"; and co-pending U.S. patent application, Ser. No. 08/593,759, filed on Jan. 29, 1996, entitled "Tiled, Flat-Panel Display Having Invisible Seams". Both U.S. Pat. No. 5,661,531 and co-pending application Ser. No. 08/593,759 are hereby incorporated by reference.

Typical practice for LCD illumination uses area light sources such as fluorescent tube arrays. A collimator must focus the light from the light source forward, toward the flat-panel display, forcing essentially all visible light energy to fall within the off-normal angle described hereinabove. Most commonly used collimators do reduce the light intensity at large off-normal angles, but do not perform well enough at small off-normal angles for use with a tiled, flat-panel display having visually imperceptible seams. A seamless appearance in a tiled, flat-panel display requires that unwanted visible light energy outside of the off-normal angle be reduced to less than one percent of the intensity of the light at a normal angle. This percentage is derived in a 1992 reference paper by G. Alphonse and J. Lubin entitled "Psychophysical Requirements for a Tiled Large Screen Display" published in SPIE Journal, Volume 1664, pp. 230–240.

In tiled, flat-panel constructions featuring a cover plate with an integral screen, the light must also be collimated to such an extent that essentially no light from one pixel can reach the screen area associated with any other pixel. Adherence to this requirement produces the sharpest possible image on the tiled, flat-panel display.

It is therefore an object of the invention to provide an apparatus and method for producing highly collimated light suitable for use with a tiled, flat-panel display having visually imperceptible seams.

It is a further object of the invention to provide a means of reducing the intensity of visible light energy, which falls outside of a desired, off-normal angle, to an acceptable level.

It is yet another object of this invention to maximize the pixel resolution in tiled, flat-panel displays by providing highly collimated light.

It is a further object of this invention to produce a wide area, collimated light source having a small depth to enable building tiled, flat-panel displays having a small overall thickness.

The present invention provides an apparatus and method for producing the highly collimated light required for use with a seamless, tiled, flat-panel display.

SUMMARY OF THE INVENTION

In accordance with the present invention, there is provided an apparatus and method for collimating light for use with a tiled, flat-panel display having a seamless appearance (i.e., having visually imperceptible seams). Both U.S. Pat. No. 5,661,531 and co-pending U.S. patent application Ser. No. 08/593,759 describe methods for producing Active Matrix LCD (AMLCD) displays by using multiple tiles coupled together in large, visually seamless arrays. The light from the illumination source for the display must be collimated to meet stringent optical standards to ensure optimum performance of the total display system. Collimation and distribution of light from the light source is typically accomplished by some or all of the following components: diffusers, brightness enhancing films, optical lenses, light-directing screens, collimating sheets, wave guides and opaque masks. The use of these components adds cost, complexity and thickness to the final display system and, in the end, they do not collimate the light sufficiently to produce a seamless appearance in a tiled, flat-panel display.

The present invention provides a novel method for collimation in a tiled, flat-panel display environment. In the inventive method, a lattice of depth, H, having an x,y cell width, W, is placed a distance, D, behind the bottom mask of the tiled, flat-panel display assembly, but in front of the illumination source. The lattice is formed from a thin, non-reflective material so that the acceptable light passing through the lattice is not "blocked" to any significant extent, but the unwanted (off-axis) light impinges upon the lattice cell walls and is absorbed. The lattice is formed from a material with surfaces that have small and uniformly minimal specular and diffuse reflectivity across the visible spectrum of light. The lattice is made with a specific relationship of cell height to cell width, typically between 1:1 and 3:1. Such cell height to cell width ratios generally keep light rays that are beyond acceptable off-normal angles, from entering the display assembly (back plate, tiles, cover plate, etc.). The lattice is placed a distance behind the display, typically between one and three times the lattice thickness, so that the cell walls of the lattice are not "imaged" onto the back of the display assembly. Such a lattice used in this way is a simple, practical way to achieve the highly collimated light required for visually imperceptible seams in a tiled, flat-panel display.

BRIEF DESCRIPTION OF THE DRAWINGS

A complete understanding of the present invention may be obtained by reference to the accompanying drawings, when considered in conjunction with the subsequent detailed description and in which.

DESCRIPTION OF THE PREFERRED EMBODIMENT

Generally speaking, the invention features an apparatus and a method for constructing a highly collimated light source for use with a seamless, flat-panel display. The degree of collimation required to achieve a seamless appearing display with a sharp image may be obtained with an open cell lattice having non-reflecting side walls. Both the lattice dimensions and the position of the lattice relative to the display are chosen so as to provide optimum collimation and illumination.

Figure 1:
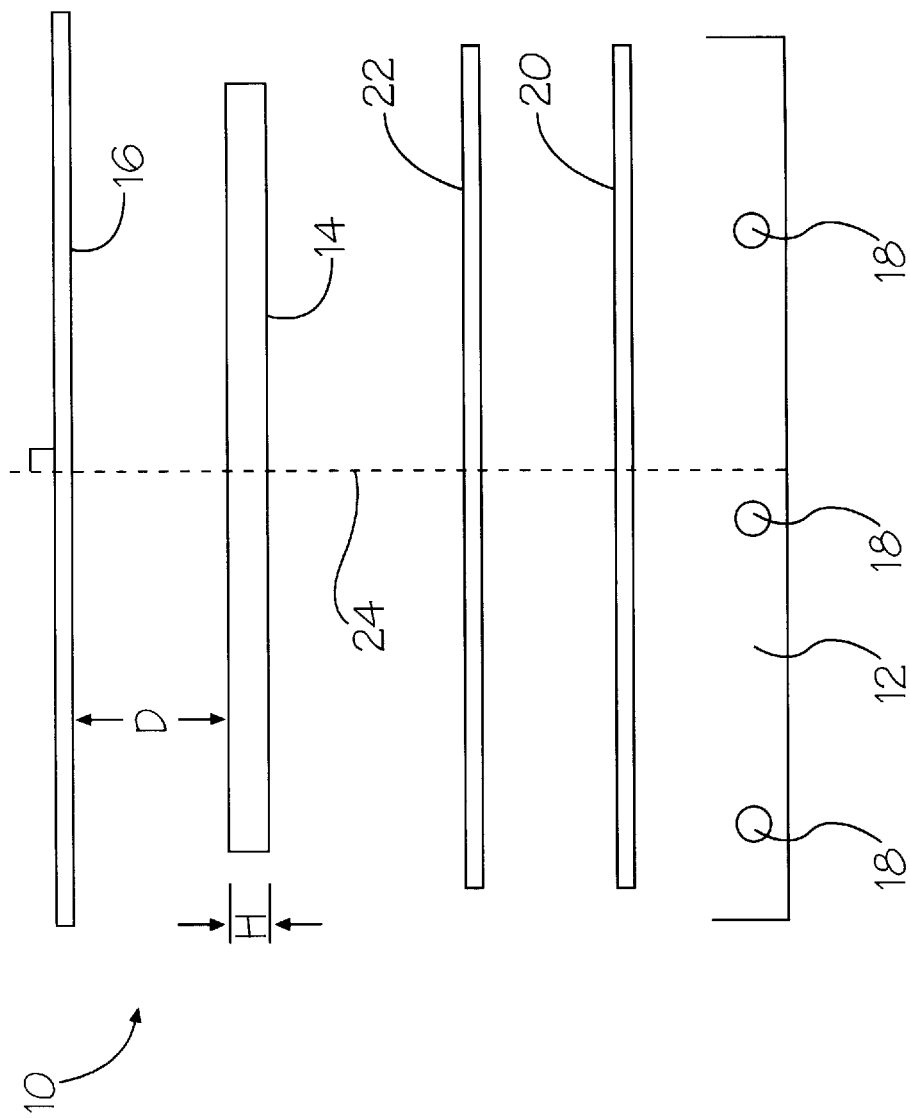
FIG. 1 is a sectional, schematic view of a flat-panel display with its associated illumination source.

Referring now to FIG. 1, a cross-sectional view of a tiled, flat-panel display assembly, using the inventive collimating lattice, is shown generally at reference numeral 10. Display assembly 10 utilizes a conventional light box 12 in conjunction with the collimating lattice 14 and a tiled, flat-panel display 16. A conventional light source for an LCD display would normally consist of three elements: a light box 12 housing one or more fluorescent lamps 18, a diffuser sheet 20, and an optical collimator (brightness enhancing films) 22. This invention adds a fourth element: a collimating lattice 14, having thickness H, and displaced distance D from the LCD display 16. Lattice 14 is used to produce the highly collimated light needed for use with a tiled, flat-panel display having visually imperceptible seams and a sharp image. Dimensions H and D will be discussed in detail hereinbelow.

Figure 2:
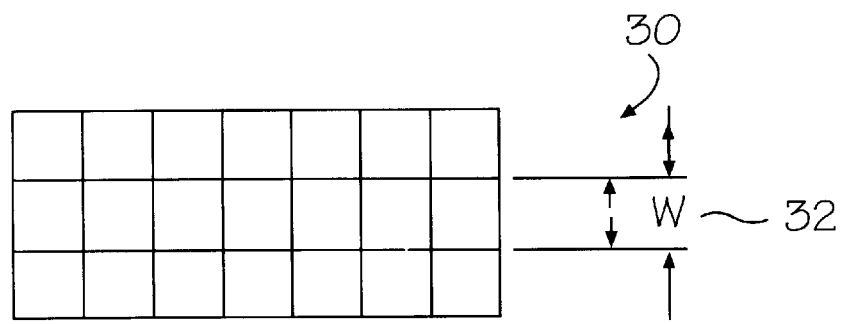
FIG. 2 is a plan view of three embodiments of collimating lattice geometries.
Figure 2:
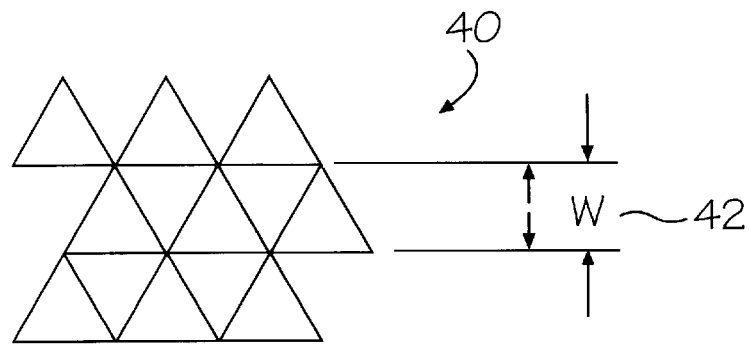
Figure 2:
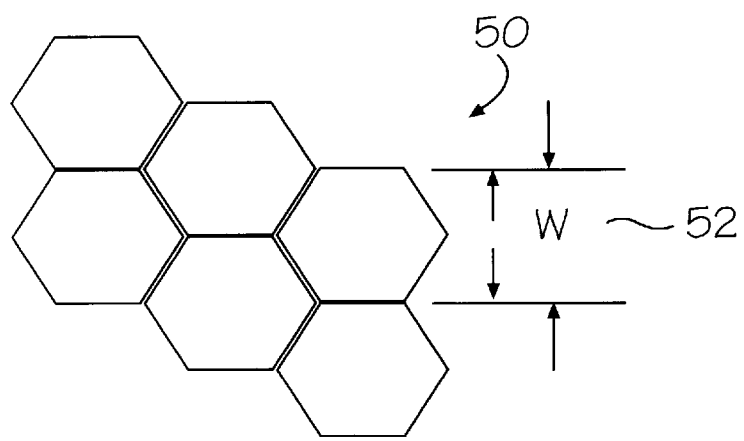

Referring now to FIG. 2, there are shown plan views of three geometric shapes of collimating lattices suitable for use in practicing the method of the present invention. The upper portion of FIG. 2 shows a lattice of square cells 30; the middle portion of FIG. 2 shows a lattice having triangular cells 40; and the lower portion of FIG. 2 shows a lattice formed from hexagonal or honey comb cells 50. The lattice cells 30, 40, 50 can be characterized by a typical cell width dimension W, of 3–5 mm, 32, 42, 52, respectively. The lattice 30, 40, 50 may be constructed from any material that is thin, such as plastic, paper, aluminum, or other metals. The interior surfaces of the cells, not shown, may be plated, dyed, painted, or treated in any other way known to those of skill in the art, to produce a surface with uniformly minimal specular and diffuse reflectivity across the visible spectrum of light. Instead of surface treatment, the material itself can be non-reflective. The wall thickness of the cells, not shown, is minimized to permit as much light as possible to pass through the lattice 30, 40, 50. In the preferred embodiment, a readily available aluminum honey comb lattice is spray- or dip-painted with a matte black paint.

Figure 3:
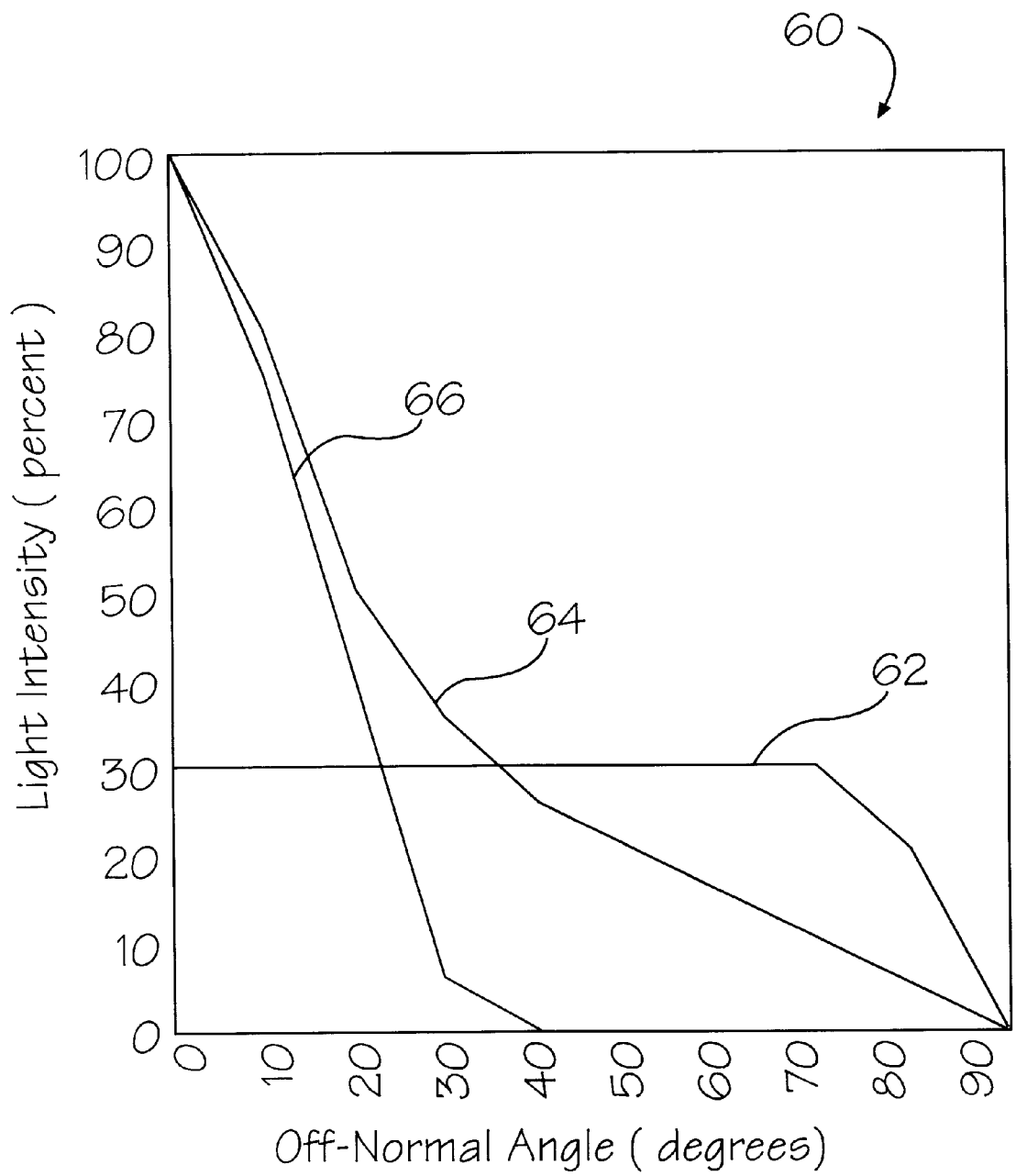
FIG. 3 is a graph showing the light-collimating ability of each element depicted in FIG. 1.

Referring now to FIG. 3, there is shown a graph 60 of the relative collimating efficiencies of various collimating elements of the light source shown in FIG. 1: diffuser 20, optical collimator 22 and lattice collimator 14. Referring now again also to FIG. 1, an ideal diffuser 20 should disperse the light from the lamps 18 forward in all directions, at uniform brightness. Light intensity should be constant at all angles measured with respect to a line 24 normal to the front or rear surface planes of the diffuser 20. Light of this nature is referred to as Lambertian. The light from lamps 18 first passes through diffuser 20 and then passes through an optical collimator or brightness enhancing film 22. These readily available devices are usually constructed of micro-geometry prismatic arrays or channels which change the Lambertian-like light distribution from a typical diffuser to a more forward peaked distribution, producing the light intensity versus off-normal angle curves 62 and 64, respectively. The light energy at angles above the desired cut-off angle (i.e., that which remains when only diffuser 20 and optical collimator 22 are used) is too high for use with a tiled, flat-panel display having visually imperceptible seams and a sharp appearance. The addition of collimating lattice 14 in accordance with the invention removes virtually all light beyond the desired cut-off angle as shown in curve 66, thus producing the desired seamless, sharp appearance of the display.

Figure 4:
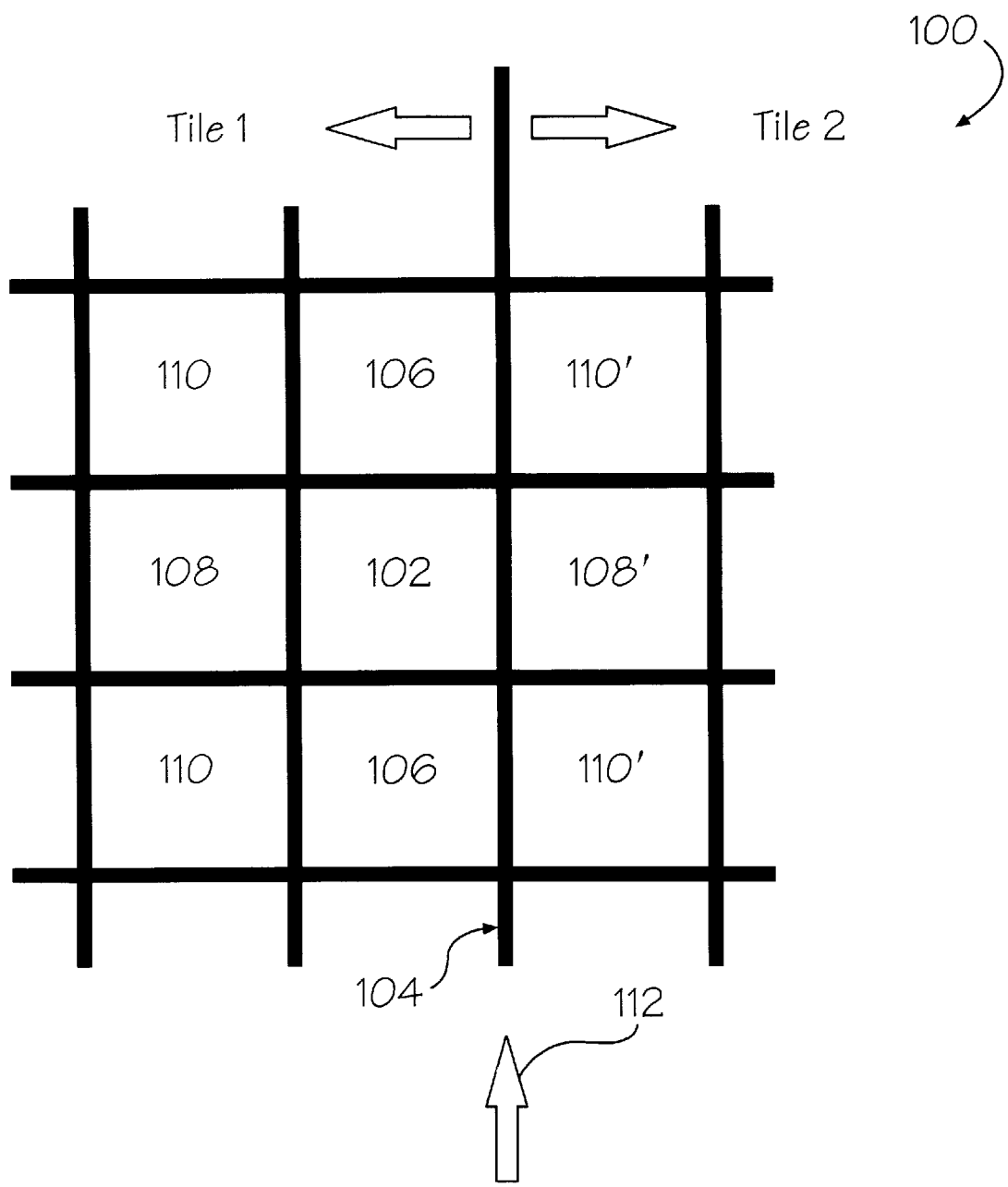
FIG. 4 is a schematic representation of a pixel and its neighboring pixels in a tiled, flat-panel display.

Referring now to FIG. 4, there is shown generally at reference number 100, a schematic view of a target display pixel 102 adjacent to a tile edge 104. Neighboring pixels, 106, 108, 108', 110 and 110' are also shown. Light entering the rear of the display (arrow 112) in the target pixel area 102 at off-normal angles beyond the desired cut-off angle exit the display in a neighboring pixel, for example through pixel areas 108 or 108'. Light passing through the display encounters a succession of optical active media: a polarizer, then liquid crystal material, and then another polarizer. At the juncture or seam 104 of two tiles, light which enters a pixel area adjacent to the seam 104 at large off-normal angles passes through the seam area between the tiles, avoiding the liquid crystal material, and exits the display through a pixel area in the adjacent tile, thereby making the seam 104 visible to the viewer. The collimating lattice 14 of this invention prohibits light that is beyond the desired off-normal angle from entering the display. The resultant effect is that pixel 110 has the same appearance (illumination level) as pixel 110' and pixel 108 has the same appearance as 108' when the target pixel 102 is illuminated.

It is desired to have light which enters the display behind the target pixel 102, pass through only the target pixel's optically active (i.e., liquid crystal) media, and exit to the viewer only in the area defined by the target pixel 102. In practice this rarely happens. Some light from adjacent pixel areas 106, 108, 110, etc. enters the target pixel 102 and exits the display through other adjacent pixel areas 106, 108, 110, etc. In addition, light entering the target pixel area 102 also exits through adjacent pixel areas 106, 108, 108', 110'. This bleeding effect limits the actual resolution of the display. The viewer is not able to discriminate individual pixels if too much stray light (light beyond the desired cut-off angle) illuminates the rear of the display. An image viewed on a display with too much stray light is perceived as out of focus compared to the same image viewed on a display with less stray light. In other words, an image viewed on a display without excessive stray light is perceived as sharper than an image viewed on a display with excessive stray light.

Figure 5:
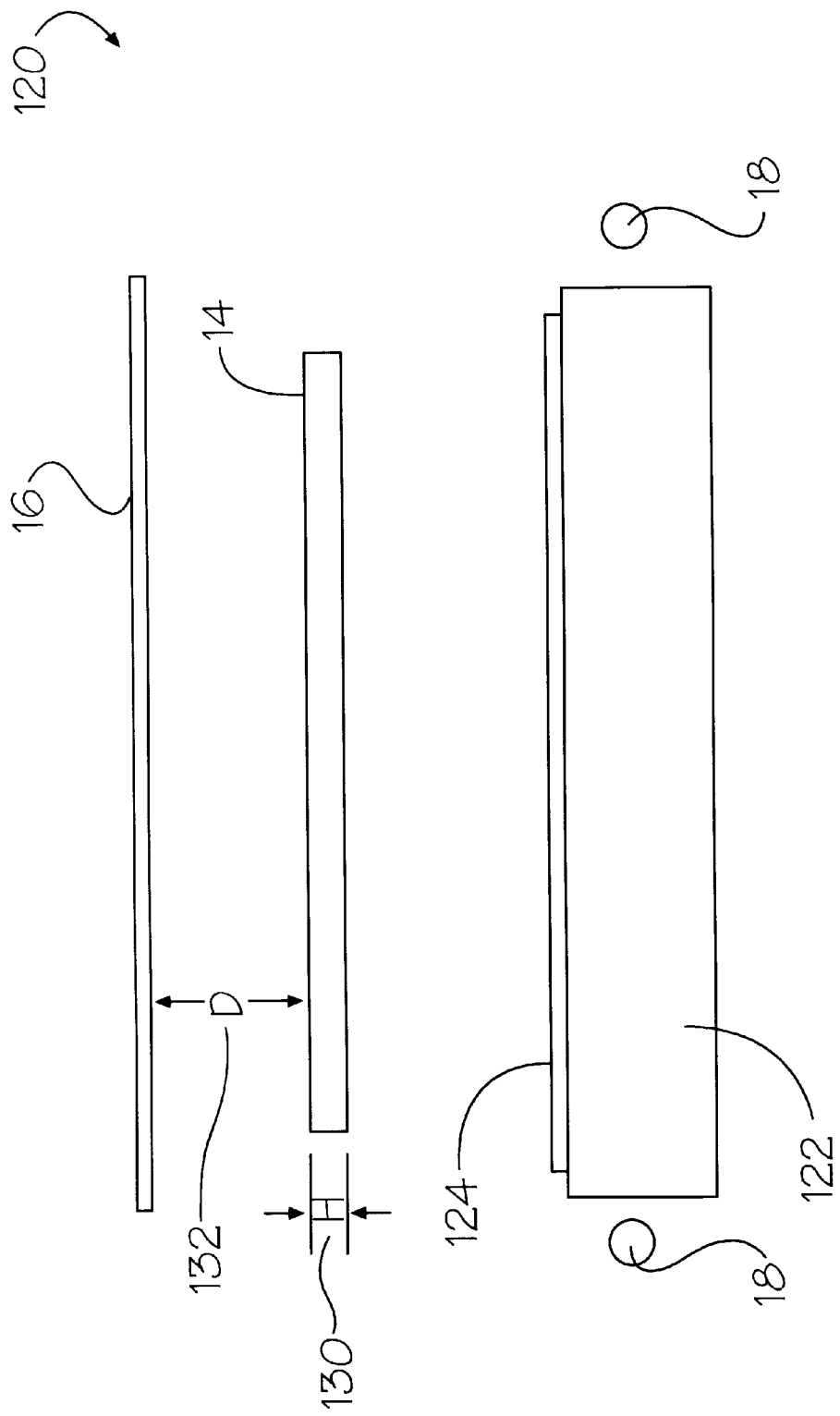
FIG. 5 is a sectional, schematic view of a flat-panel display, including an optical collimator.

Referring now to FIG. 5, an alternative apparatus and method for producing light for a LCD display are shown, generally at reference numeral 120. This method is based on edge lighting a wave guide 122 with small diameter fluorescent lamps 18. Waveguide 122 is made of an optically clear material such as acrylic, glass, or polycarbonate. A collimating sheet 124 is bonded to the top of wave guide 122 using an optically transmissive adhesive having a suitable index of refraction such as acrylic adhesive or clear silicone adhesive. Collimating sheet 124 typically comprises arrays of Fresnel-type lenses and works on the principle of total internal reflection. The light produced by such a light source assembly 18, 122, 124 is collimated, but not sufficiently for a tiled, flat-panel display 16 to appear sharp and seamless. The addition of a collimating lattice 14 used in conjunction with this type of light source assembly does provide the necessary degree of collimation.

The desired collimation angle can be calculated from a consideration of the display pixel geometry and mask geometry within display 16. The collimating lattice 14 is selected by choosing a ratio of lattice cell width W 32, 42 or 52 to lattice cell depth H 130, equal to the tangent of the desired collimation or cut-off angle. The collimating lattice 14 must be placed a sufficient distance, D 132, behind the display so that the shadow of the cell geometry itself is not imaged (i.e., projected or shadowed) onto display 16.

A typical tiled display 16 may dictate a collimation angle of 25 degrees off-normal. The lattice is then selected with a height H 130 equal to twice the cell width W. A larger ratio may also work, but can result in discarding more of the available visible light energy than is necessary. The collimating lattice 14 must be placed at a distance of at least D 132 from the display 16 greater than twice the cell height H 130 in order to avoid imaging the lattice 14 by the display 16 in this example. Typically, the ratio of the lattice cell width W to cell height H 130 is the same as the ratio of the cell height H 130 to lattice-to-display distance D 132. There is no required relationship between the pixel pitch or spacing, not shown, in display 16 and the collimating lattice 14 cell dimensions.

Since other modifications and changes varied to fit a particular operating requirements and environment will be apparent to those skilled in the art, the invention is not considered limited to the example chosen for purposes of disclosure, and covers all changes and modifications which do not constitute a departure from the true spirit and scope of the invention. Having thus described the invention, what is desired to be protected by Letters Patent is presented in the subsequent appended claims.

What is claimed is:

1. A tiled, flat-panel display having visually imperceptible seams, comprising:
   a) a plurality of co-planar, transmissive display tiles comprising a back plate mask and arranged adjacent one another with seams therebetween, said tiles having a thickness and comprising pixel active areas;
   b) a light source disposed behind said plurality of display tiles; and
   c) light collimating means proximate said light source and intermediate said light source and said plurality of display tiles and distinctly separate therefrom, said light collimating means selectively directing light from said light source to said pixel active areas and blocking light from said seams, said selectively directed light having a predetermined angular relationship to said pixel active areas, comprising a critical angle determined by at least one of the factors:
   thickness of said plurality of display tiles; dimensions of said back plate mask; and a predetermined distance between said light collimating means and said plurality of display tiles, and wherein said light collimating means comprises a lattice having a thickness defined by a cell height "H" and having a plurality of open, visually transmissive cells of width "W".

2. The tiled, flat-panel display having visually imperceptible seams as recited in claim 1, wherein the geometry of said visually transmissive cells comprises one from the shapes: rectangle, square, triangle and polygon.

3. The tiled, flat-panel display having visually imperceptible seams as recited in claim 2, wherein said width, W, and said height, H, of said open, visually transmissive cells define cell walls.

4. The tiled, flat-panel display having visually imperceptible seams as recited in claim 3, wherein said walls of said open, visually transmissive cells exhibit properties of minimally uniform specular and diffuse reflectivity over the visible spectrum of said light.

5. The tiled, flat-panel display having visually imperceptible seams as recited in claim 4, wherein said cell walls are coated.

6. The tiled, flat-panel display having visually imperceptible seams as recited in claim 3, wherein said cell height, H, and said cell width, W, have a ratio of between approximately 1:1 and 3:1.

7. The tiled, flat-panel display having visually imperceptible seams as recited in claim 3, wherein said distance from said lattice to said plurality of display tiles is approximately twice said cell height, H.

8. The tiled, flat-panel display having visually imperceptible seams as recited in claim 1, wherein said critical angle is approximately 25 degrees.

9. A method for generating highly collimated light over a large area for use in conjunction with a tiled, flat-panel display having visually imperceptible seams, the steps comprising:
   a) providing a tiled, flat-panel display comprising a plurality of co-planar, transmissive display tiles arranged adjacent one another with seams therebetween, said tiles having a thickness and comprising pixel active areas;
   b) generating light by a conventional light source operatively positioned behind said tiled, flat-panel display to illuminate said tiled, flat-panel display; and
   c) collimating light by means of an interposed light collimating means between said light source and said tiled, flat-panel display at a predetermined distance such that substantially all light generated by said light source and applied to said tiled, flat-panel display passes through said light collimating means, and said light applied to said display is directed to said pixel active areas, wherein said light collimating means comprises a lattice having a thickness defined by a cell height "H" and having a plurality of open, visually transmissive cells having a cell geometry defined by a width "W".

10. The method for generating highly collimated light as recited in claim 9, wherein said geometry comprises one from the shapes: rectangle, triangle, polygon and hexagon.

11. The method for generating highly collimated light as recited in claim 10, wherein said width, W, and said height, H of said open, visually transmissive cells define cell walls.

12. The method for generating highly collimated light as recited in claim 11, wherein said walls of said open, visually transmissive cells exhibit properties of minimally uniform specular and diffuse reflectivity over the visible spectrum of said light.

13. The method for generating highly collimated light as recited in claim 12, the steps further comprising coating said walls.

14. The method for generating highly collimated light as recited in claim 13, wherein said cell height, H and said cell width, W, have a ratio of between approximately 1:1 and 3:1.

15. The method for generating highly collimated light as recited in claim 14, wherein a predetermined distance from said lattice to said tiled, flat-panel display is approximately twice said cell height, H.

* * * * *